Patented Nov. 26, 1940

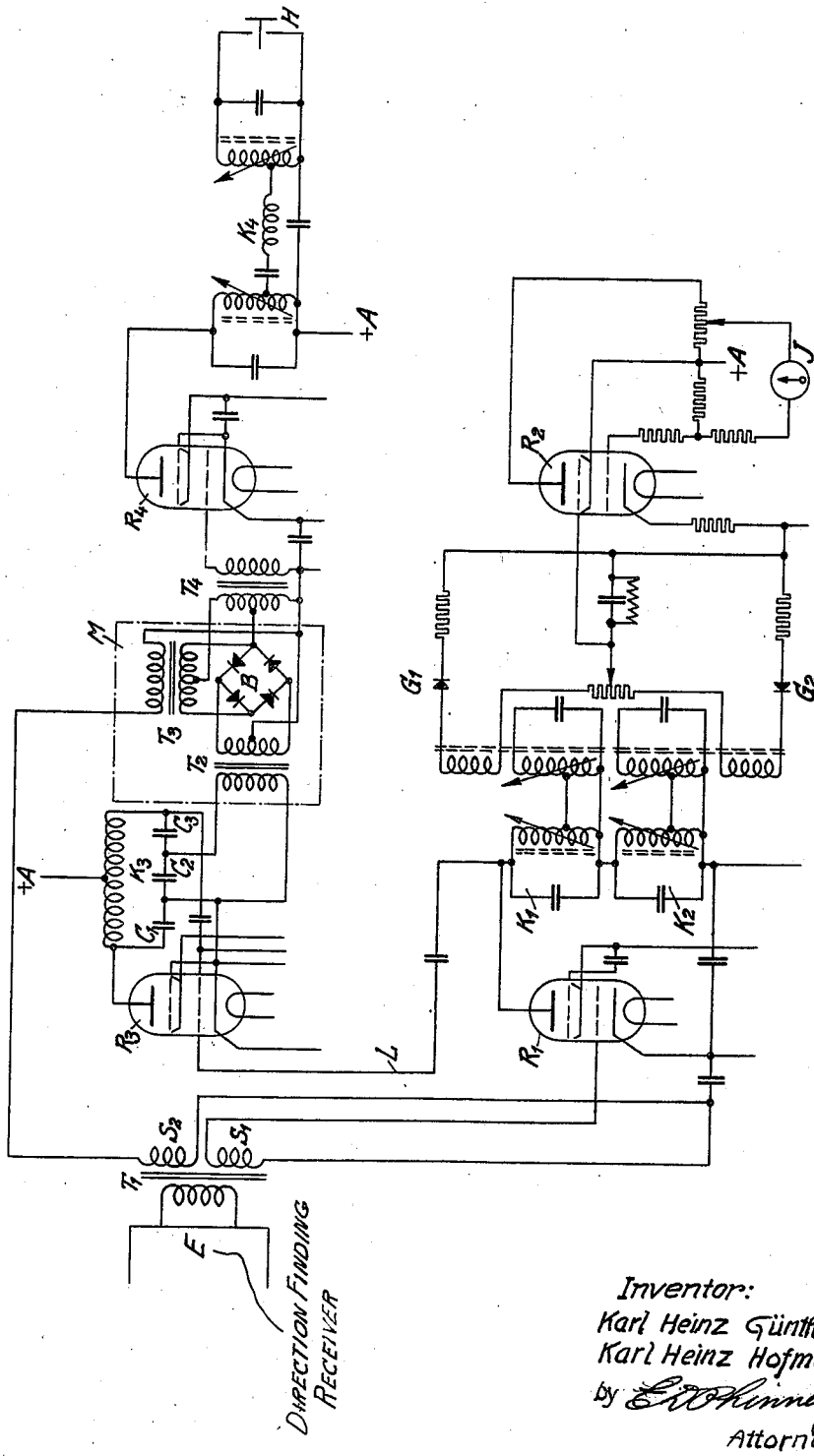

2,223,065

UNITED STATES PATENT OFFICE 2,223,065

RADIO DIRECTION FINDING SYSTEM

Karl Heinz Günthert and Karl Heinz Hofmann, Berlin, Germany, assignors to C. Lorenz Aktiengesellschaft, Berlin-Tempelhof, Germany, a company Application April 29, 1939, Serial No. 270,800
In Germany May 5, 1938

4 Claims. (Cl. 250—11)

This invention relates to radio direction finding systems, and more particularly to methods of and means for determining navigatory positions.

The copending application Ser. No. 251,497, entitled "Methods of determining navigatory positions," filed January 18, 1939, in the name of Joachim Goldmann with assignment to C. Lorenz Aktiengesellschaft of Berlin-Tempelhof (Germany) discloses a method of determining positions, of aircraft, for example. This disclosure makes use of the principle of effecting amplitude comparison between complementary signals, according to which the signals of different kind, such as dots and dashes, or the Morse code signals A and N, alternately emitted from a radio transmitter are each modulated with a distinguishing frequency in order to allow an amplitude comparison between the different modulation frequencies to be performed in a receiving position, such as an aeroplane, for example, for the purpose of effecting not only visible, but also aural position indications. These differently modulated signals are in the first hand segregated from one another in a filtering device forming part of the receiver, and are then applied to a metering instrument which optically indicates the result obtained by comparison therebetween. The above mentioned disclosure on the other hand provides additional means for obtaining an aural position indication, and proposes for this purpose to so superpose a particular frequency on the two differently modulated signal frequencies, that the resulting frequencies, that is, the sum of this particular frequency and either of the modulated signal frequency and the difference frequency resulting from a subtraction of said particular frequency from the other of the modulated signal frequencies coincide with one another on the same frequency level.

Careful investigations have meanwhile proven that the above disclosed method encounters the disadvantage that a phase displacement of the superposing or heterodyning frequency relative to the phase of the received modulated signal frequencies changes the amplitude relations between the heterodyne oscillations intended for audible comparison, which changes may give rise to faulty indications or to a signal reversal.

It is the main object of this invention to overcome the difficulties referred to above, and this is achieved in accordance with the main feature of our invention by synchronizing the heterodyning frequency generator by means of the differently modulated signal frequencies received.

It has been assumed in the embodiment disclosed in the heretofore mentioned copending application Ser. No. 251,497, that one of the signals of different kind emitted from the transmitter is modulated with a frequency of 800 cycles per second, while the modulation frequency for the complementary signal was chosen to be 1200 cycles per second. Each of the received signals of different kind modulated with its aforementioned distinguishing frequency is so superposed by a local frequency of 200 cycles per second, that the sum of one of the signal modulation frequencies and the local frequency is the same as the difference between the other of said signal modulation frequencies and the said local frequency, that is, 1000 cycles per second. These two frequencies of 1000 cycles per second are first passed through a filter and then audibly compared with one another in any manner known in the art.

The generator producing the aforementioned local oscillation frequency of 200 cycles per second is according to the main feature of this invention synchronized by the received signal modulation frequencies of 800 and 1200 cycles per second. This facility ensures constant phase relationship between the signal modulation frequencies and the local frequency and does away with all possibilities for false indications.

In accordance with a further feature of this invention, the phase relationship between the individual signal modulating frequencies is maintained constant by synchronizing these frequencies in the transmitting position, preferably by deriving the two signal modulating frequencies by proper multiplication from a single oscillation generator common thereto.

The invention will be more readily understood from the following description taken in conjunction with the accompanying drawing, the single figure of which diagrammatically shows the circuit arrangement in the receiving position.

A transformer T1 is connected to the output circuit of a direction finding receiver E. This transformer repeats the signals of different kind, each being modulated with a distinguishing frequency. In a similar manner as in connection with the aforementioned copending application Ser. No. 251,497, it will be assumed that the signals of one kind are modulated with a frequency of 800 cycles per second, while the complementary signals are modulated with a frequency of 1200 cycles per second. These two frequencies are applied to an amplifier valve R1 through the secondary winding S1 of the transformer T1. A filter chain K1 tuned to the frequency of 800 cycles per second and a further filter chain K2 tuned to the frequency of 1200 cycles per second are connected in the anode circuit of the amplifier valve R1. A bridge circuit is connected to the output side of the signal modulation frequency separating filter chains, and the central branch of this bridge circuit is connected to an amplifying tube R2, while the two outer branches of the bridge circuit each include a rectifier G1 and G2, respectively, adapted to rectify the modulation frequencies. The amplifying tube R2 has for its object to amplify the amplitude difference between the two rectified signal modulation frequencies in order to enhance the sensitivity of indication. A metering device J, the pointer of which is adapted to move either to the left or to the right side is connected in the output circuit of the amplifier tube R2. The metering device or indicator J is preferably connected in a bridge circuit between the anode and one of the grids of the amplifier tube R2 in order to render this instrument and its indication independent of the heating current for the filament of the tube R2. In case that the heating current is subjected to changes, the grid-to-cathode impedance and the cathode-to-anode impedance vary at the same rate so that the pointer indication on the instrument J remains constant.

In order to enable an aural position indication, the signal modulation frequencies are also derived from a second secondary winding S2 of the transformer T1 and are applied to a mixing stage M, in order to be influenced by a local frequency of 200 cycles per second. This local frequency of 200 cycles per second is generated in a thermionic valve R3, in the anode circuit of which an oscillatory circuit K3 is included. This oscillatory circuit is tuned to the local frequency of 200 cycles per second. The thermionic valve R3 generating the local or heterodyning frequency is according to one feature of this invention synchronized by means of the received signal modulation frequencies. This synchronization may, by way of example, be effected in such manner that the frequency of 800 cycles per second is derived from the filter chain K1 and applied to the grid of the thermionic valve R3 over the conductor L. The capacity of the oscillatory circuit K3 interposed in the anode circuit of the local oscillation generator R3 is formed by three separate condensers C1, C2 and C3 which together constitute a voltage divider. The resulting frequency of 200 cycles per second is derived across the two plates of the central condenser C2 and is impressed upon a transformer T2 of the primary side of the mixing stage M. This voltage dividing circuit involves the advantage that the synchronizing frequency of 800 cycles per second is substantially suppressed. Because of the fact that the impedance of the condensers C1, C2 and C3 presents a considerably higher value for the frequency of 200 cycles per second than for that of 800 cycles per second, the voltage of the desired frequency of 200 cycles per second is considerably higher than that of the frequency of 800 cycles per second which merely serves for effecting synchronization.

The heterodyning procedure in the mixing stage M is preferably effected in accordance with any known method by means of dry rectifiers forming part of a bridge circuit B. This type of bridge circuit is particularly advantageous in aeroplanes due to the small space being required for such devices and the low weight thereof. The received signal modulation frequencies are impressed upon this dry rectifier bridge circuit through the transformer T3. The resulting sum and difference frequencies occurring in the output circuit of the mixing or modulating stage are applied to an amplifier tube R4 through a transformer T4. A filter chain K4 tuned to the frequency of 1000 cycles per second is connected in the anode circuit of the amplifier tube R4. This filter chain is adapted to pass the frequencies of 1000 cycles per second which are to be compared with one another, and to reject the undesired fundamental frequencies, sum and differential frequencies, that is, those of 600, 800, 1200 and 1400 cycles per second. The audible frequency is then drawn from the filter chain K4 and applied to a telephone or similar device either without or with an additional amplification.

What is claimed is:

1. In combination with a radio beacon transmitter adapted to alternately emit signals of different kind, such as dots and dashes, each being modulated with a given distinguishing modulation frequency, a direction finding receiver cooperating with said transmitter and comprising, means for receiving said signal modulation frequencies, means responsive to said received modulation frequencies to effect visual position indication, a local oscillation generator producing a given frequency, means for superposing said given frequency on said signal modulation frequencies for effecting additional aural position indication, and means to synchronize the frequency of said local oscillation generator by the received signal modulation frequencies.

2. In combination with a radio beacon transmitter adapted to alternately emit signals of different kind, such as dots and dashes, each being modulated with a given distinguishing modulation frequency, a direction finding receiver cooperating with said transmitter and comprising, means for receiving said signal modulation frequencies, an amplifying tube having at least a cathode, a control grid and an anode, means to impress the received different signal modulation frequencies on the said grid, filter devices in the anode circuit of said amplifying tube and individually tuned to either of said signal modulation frequencies to separate said frequencies for accomplishing visual position indication, a local oscillation generator tube having at least a cathode, a grid and an anode for producing a given frequency, means for superposing said local oscillations and said modulation frequencies to produce audio indicating signals of like frequency, and means to derive one of said signal modulation frequencies from one of said filter devices and to apply this frequency to the grid of said local generator tube for synchronizing the frequency of said local generator by the said last mentioned signal modulation frequency.

3. In combination with a radio beacon transmitter adapted to alternately emit signals of different kind, such as dots and dashes, each modulated with a given distinguishing modulation frequency, a direction finding receiver cooperating with said transmitter and comprising, means for picking up said signal modulation frequencies, an amplifying tube having at least a cathode, a control grid and an anode, means to impress the picked up different signal modulation frequencies on said grid, filter devices in the anode circuit of said amplifying tube individually tuned to either of said signal modulation frequencies to separate said frequencies for accomplishing visual position indication, a local oscillation generator tube having at least a cathode, a grid and an anode for producing a given superposing frequency, a frequency mixing device, means to also apply the picked up signal modulation frequencies to said mixing device, an oscillatory circuit consisting of an inductance and a composite capacity arrangement connected to the anode of said local oscillation generator for passing and likewise impressing the frequency of said generator upon said mixing device for superposition of said local oscillations on the signal modulation frequencies, and means to derive one of said signal modulation frequencies from one of said filter devices and to apply this frequency to the grid of said local generator tube for synchronizing the frequency of said local generator by the said last mentioned signal modulation frequency.

4. The invention as defined in claim 3, characterized in that said mixing device comprises a bridge circuit having dry rectifiers included in its indivdual branches.

KARL HEINZ GÜNTHERT.
KARL HEINZ HOFMANN.